United States Patent
Eslambolchi et al.

(10) Patent No.: US 7,362,712 B1
(45) Date of Patent: Apr. 22, 2008

(54) SONET NETWORK OUTAGE IMPACT MEASUREMENT

(75) Inventors: Hossein Eslambolchi, Los Altos Hills, CA (US); Kerrie Linker, Middletown, NJ (US); Alexander Novokshanov, Alpharetta, GA (US); Harold J. Stewart, Alpharetta, GA (US); Denis Yankin, Alpharetta, GA (US)

(73) Assignee: AT&T Corp., New York, NY (US)

( * ) Notice: Subject to any disclaimer, the term of this patent is extended or adjusted under 35 U.S.C. 154(b) by 883 days.

(21) Appl. No.: 10/749,049

(22) Filed: Dec. 29, 2003

(51) Int. Cl.
*H04L 1/00* (2006.01)

(52) U.S. Cl. ...................... 370/242; 370/252
(58) Field of Classification Search ............... 370/241, 370/242, 243, 244, 246, 252, 253; 709/224
See application file for complete search history.

(56) References Cited

U.S. PATENT DOCUMENTS

| | | | | |
|---|---|---|---|---|
| 5,946,373 | A * | 8/1999 | Harris | 379/14.01 |
| 6,452,906 | B1 * | 9/2002 | Afferton et al. | 370/242 |
| 6,545,976 | B1 * | 4/2003 | Gentile et al. | 370/216 |
| 6,654,375 | B1 * | 11/2003 | Vedder | 370/394 |
| 6,717,909 | B2 * | 4/2004 | Leroux et al. | 370/228 |
| 6,721,269 | B2 * | 4/2004 | Cao et al. | 370/227 |
| 6,765,874 | B1 * | 7/2004 | Carder et al. | 370/244 |
| 7,107,353 | B1 * | 9/2006 | Rice | 709/240 |

* cited by examiner

*Primary Examiner*—Ricky Q. Ngo
*Assistant Examiner*—Gary Mui
(74) *Attorney, Agent, or Firm*—Wendy W. Koba

(57) ABSTRACT

In accordance with the teachings of the present invention, a method and apparatus is presented for determining minutes of outage. Information associated with a facility hierarchy is acquired. In one embodiment, the facility hierarchy is a SONET facility hierarchy. Outage is determined for each level in the hierarchy and a correlation is performed on the outages associated with each level in the hierarchy.

5 Claims, 8 Drawing Sheets

SONET NETWORK OUTAGE IMPACT MEASUREMENT

BACKGROUND OF THE INVENTION

1. Field of the Invention

This invention relates to communication. Specifically, the present invention relates to network testing and measurement.

2. Description of the Prior Art

Maintaining a communication network includes monitoring the network. The network is often monitored for a variety of factors. For example, the network may be monitored for performance, network outages, etc.

Federal regulations require that service provider network outages are accurately logged and communicated to federal agencies. Failure to do so may affect the service provider adversely. Failures in a SONET network are measured in Minutes of Outage (MOO). To gain accurate and precise MOO(s) a variety of factors have to be considered. For example, there are typically a large number of optical facilities such as OC48 facilities in a network. Each OC48 facility may be part of a facility hierarchy. For example, a higher-level OC48 facility may include lower-level facilities, such as OC1(s), T3(s), T1(s), etc. In conventional systems when a level in the hierarchy fails, a single outage may be counted more than once for the same failure. For example, several levels in the hierarchy may be counted and each level may be counted more than once.

Referring to FIG. 1, if a failure is detected on a lower-level facility as well as on the uppermost OC48 facility, it should not be counted twice towards MOO, since the failure of the lower-level facility will already be counted as part of the higher-level OC48 outage. Also, MOO should not be counted if any SONET facility is scheduled for planned maintenance. Double counting and counting planned maintenance can result in inaccurate MOO calculations. As a result, incorrect MOO values may be communicated to federal authorities. This could result in penalties for a service provider.

In FIG. 1, time in increments of 5 seconds is shown on the x-axis beginning with 11:00 and ending with 13:00. Each vertical bar is defined as a five-minute interval. A facility hierarchy is shown on the y-axis. The facility hierarchy includes $T3_3$, $OC1_2$, $OC1_1$ and OC48. Lastly, planned maintenance (PM) is shown on the y-axis.

In FIG. 1, a set of alarms on different levels of the same OC48 hierarchy is shown. As shown, "alarm_11" for the OC48 failed at 11:00 and was restored at 11:20. The "alarm_12" for the OC1, failed at 11:15 and was restored at 11:25. Using conventional methods, "alarm_12" would count for 20 minutes in the MOO calculation and "alarm_12" would count for 10 minutes in the MOO calculation. However, since the failure on the OC48 (i.e., alarm_11), which is a higher-level facility, overlaps with the failure on the OC1 (i.e., alarm_12), which is a lower-level facility, the first five minutes of "alarm_12" should not be counted toward the MOO calculation. However, in conventional systems, the overlap is counted twice (i.e., double counted).

Thus, there is a need for a method of accurately calculating MOO in facility hierarchies.

SUMMARY OF THE INVENTION

The present invention utilizes a specific methodology to avoid errors, such as over counting in SONET outage impact calculation, while accurately measuring the SONET facility failure impact. In particular, the inventive SONET impact calculation methodology is defined as a set of data processing procedures and business rules. The methodology measures SONET outage impact, such as MOO. The MOO measurement is based on the SONET facility hierarchy and a set of alarms, where the alarms are correlated between the higher and lower levels in the hierarchy, with other alarms associated with any planned maintenance activities for the SONET facility.

The procedure considers a variety of factors to compute the MOO. To gain accurate results, the procedure incorporates the exact SONET facility hierarchy, from OC48 to T1, a list of services on failed facilities (i.e., if they were used to provide transport services), and planned maintenance time spans on those facilities (i.e., if its timeframe overlaps with failure timeframes). All of these factors are then used in the logic to prevent over counting of outage impact. For example, if a failed condition was reported during a planned activity on the facility, that failure will not be counted towards the MOO, which later would be used for reporting and statistical purposes (i.e., federal compliance).

A method operating comprises the steps of receiving information identifying a higher-level alarm associated with a SONET facility; receiving information identifying a lower-level alarm associated with the SONET facility; determining minutes of outage in response to receiving the information identifying the higher-level alarm associated with the SONET facility and the information identifying the lower-level alarm associated with the SONET facility.

A method of determining minutes of outage comprises the steps of acquiring facility hierarchy information, the facility hierarchy information depicting a facility hierarchy, the facility hierarchy including levels; determining outage for each level in the facility hierarchy in response to acquiring the facility hierarchy information; and determining minutes of outage in response to determining the outage for each level in the facility hierarchy.

A method of determining minutes of outage comprises the steps of operating a database storing facility hierarchy information representing a facility hierarchy; receiving alarm information; identifying new facility information representing at least one new facility in response to receiving the alarm information; storing updated facility hierarchy information by inserting the new facility information into the database in response to identifying the new facility information, the updated facility hierarchy information representing an updated facility hierarchy; and determining minutes of outage in response to creating an updated facility hierarchy.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
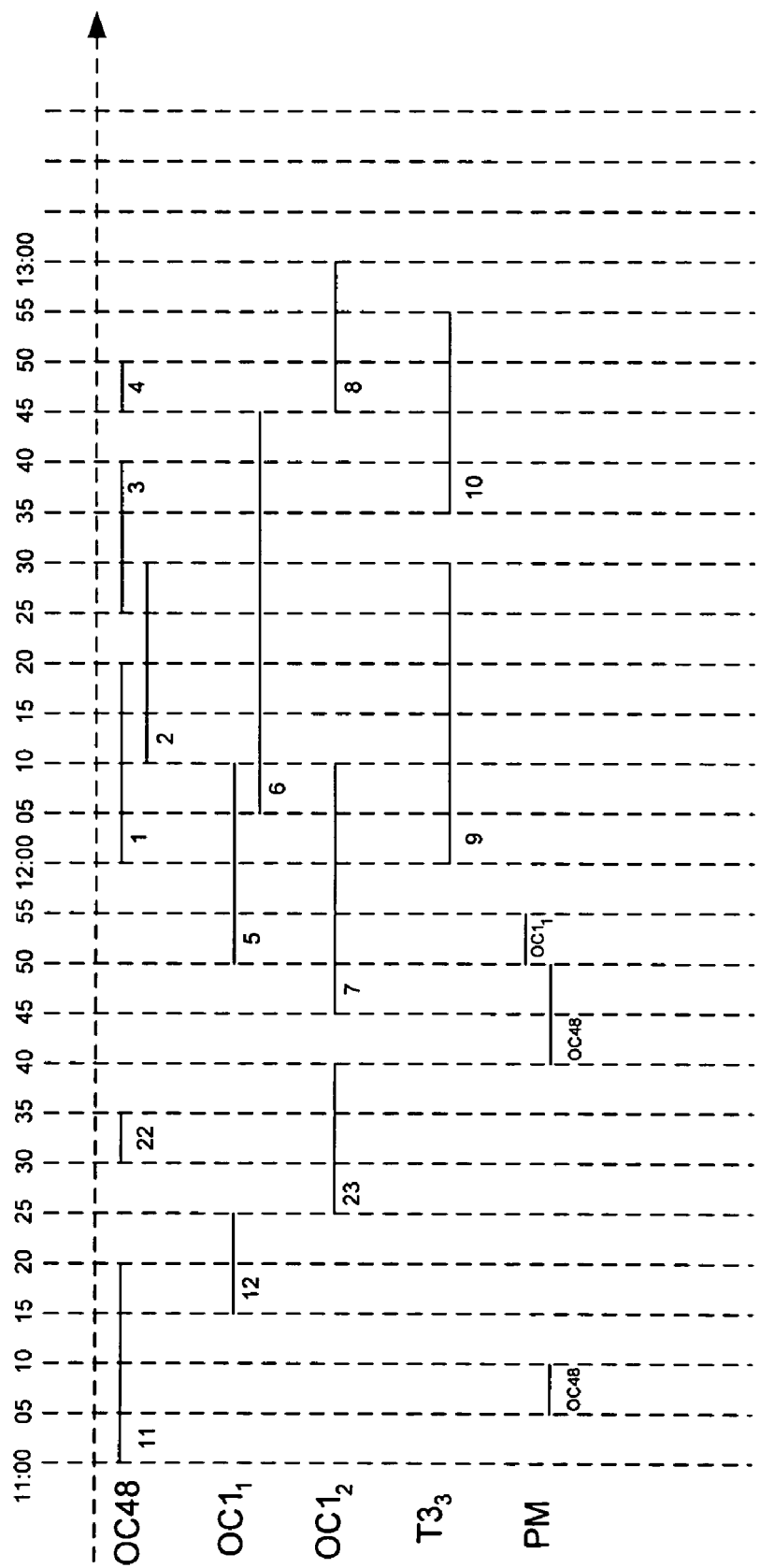
FIG. 1 displays a prior art-timing chart.
Figure 2:
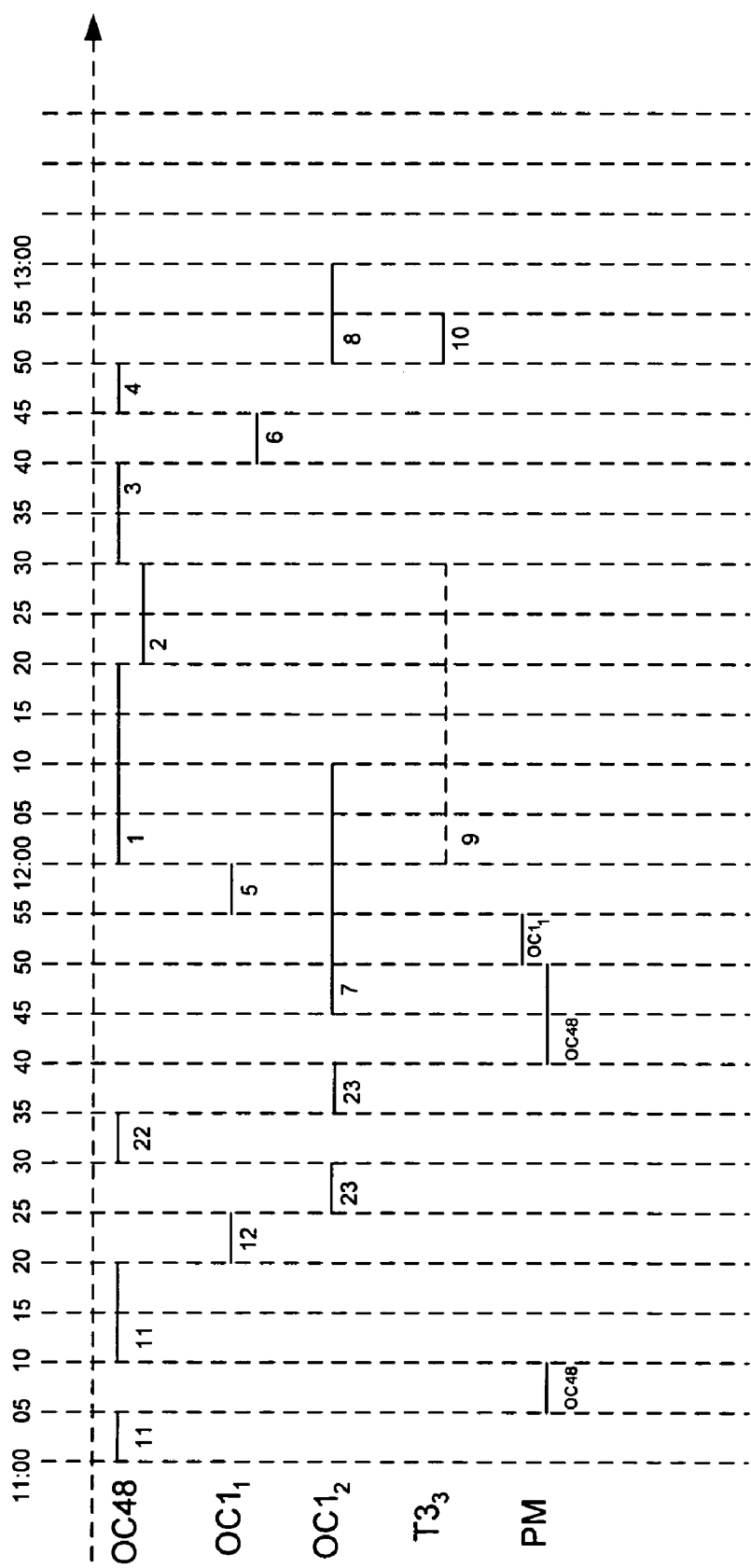
FIG. 2 displays a timing chart implemented in accordance with the teachings of the present invention.

FIG. 2 displays a timing chart implemented in accordance with the teachings of the present invention. In FIG. 2, if a higher-level facility failure starts and finishes in the middle of a lower-level facility failure timeframe, then the lower-level facility failure will be split in two parts, as is shown by "alarm_22" and "alarm_23." The number of minutes for "alarm_22" is 5 minutes and the number of minutes for "alarm_23" will be 10 minutes. It should be appreciated that this methodology may be implemented for any alarms on a facility that overlap. In the case of planned maintenance (PM), a PM is scheduled for OC48 from 11:05 to 11:10. This PM will split the OC48 facility failure, as well as any other failures on the lower-level facilities (if any). The OC48 failure will be split into two pieces, one from 11:00 to 11:05 and the other from 11:10 to 11:20 for a total MOO of 15 minutes. It should be appreciated that the foregoing methodology may be extended to include the overlap associated with maintenance (i.e., planned, etc). Further, it should be appreciated that in one embodiment of the present invention, outage times associated with each facility in a facility hierarchy and planned maintenance are correlated to determine the MOO.

Figure 3:
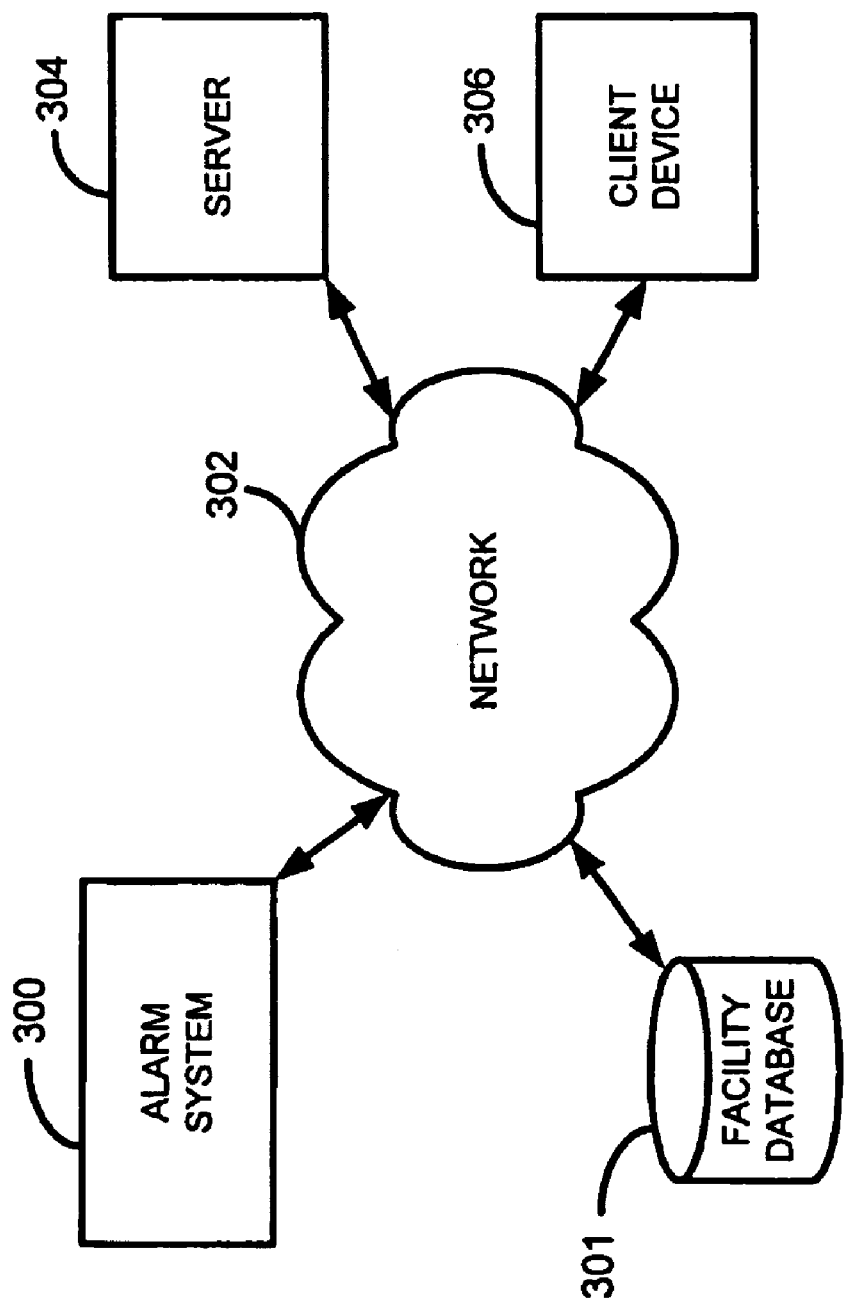
FIG. 3 displays a network architecture implemented in accordance with the teachings of the present invention.

FIG. 3 displays a network architecture implemented in accordance with the teachings of the present invention. An alarm system 300 is shown. In one embodiment, the alarm system 300 acquires, manipulates, analyzes, and outputs alarms directly from a network, from alarm devices, from human input, etc. In accordance with the teachings of the present invention, alarm system 300 may be a SONET alarm system acquiring, manipulating, and analyzing information associated with a SONET hierarchy.

Alarm system 300 is in communication with network 302. Network 302 may be implemented with a variety of technologies. For example, network 302 may be implemented as a packet-switched network, as a circuit-switched network, as an integrated packet and circuit-switched network, as a wireless network, a Local Area Network, a Wide Area Network, etc.

A facility database is shown as 301. In one embodiment of the present invention, the facility database 301 stored customer network information. In another embodiment of the present invention, the facility database is a knowledge database which may include OC48 information, circuit ID information, which customers are organized on which facility, which services are riding on which facility, such as ATM, IP, frame relay, the full hierarchy of the facility, etc. It should be appreciated that this information is defined for a variety of facilities.

A server 304 is shown. In one embodiment, the server 304 is used in combination with the alarm system 300 to perform analysis of alarms and distribute alarm information throughout the network 302. A client device 306 is shown. In one embodiment, the client device 306 works in conjunction with the server 304 to distribute information throughout the network 302. It should be appreciated that in one embodiment of the present invention, a method of determining MOO may be performed by the alarm system 300, the server 304, or the client device 306. In another embodiment of the present invention, the method of determining MOO may be performed by the alarm system 300, the server 304, and/or the client device 306 in combination.

Figure 4:
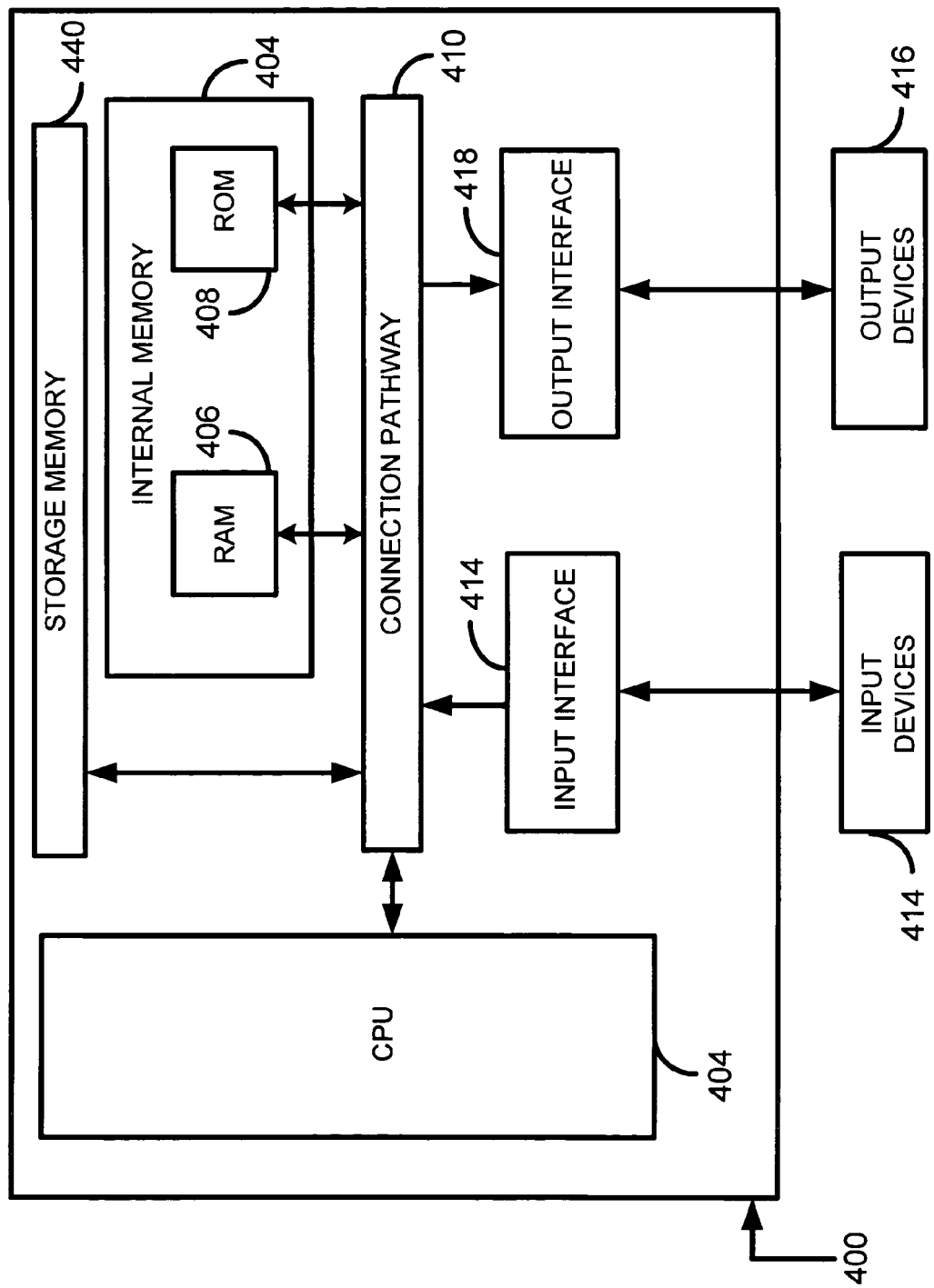
FIG. 4 displays a block diagram of a computer implemented in accordance with the teachings of the present invention.

FIG. 4 displays a block diagram of a computer implemented in accordance with the teachings of the present invention. The computer architecture 400 of FIG. 4 may used to implement the alarm system 300, the network 302, the server 304, and/or the client device 306. A central processing unit (CPU) 402 functions as the brain of the computer architecture 400. Internal memory 404 is shown. The internal memory 404 includes short-term memory 406 and long-term memory 408. The short-term memory 406 may be a Random Access Memory (RAM) or a memory cache used for staging information. The long-term memory 408 may be a Read Only Memory (ROM) or an alternative form of memory used for storing information. Storage memory 440 may be any memory residing within the computer architecture 400 other than internal memory 404. In one embodiment of the present invention, storage memory 440 is implemented with a hard drive. A communication pathway 410 is used to communicate information within computer architecture 400. In addition, the communication pathway 410 may be connected to interfaces, which communicate information out of the computer architecture 400 or receive information into the computer architecture 400.

Input devices, such as tactile input device, joystick, keyboards, microphone, communication connections, or a mouse, are shown as 412. The input devices 412 interface with the system through an input interface 414. Output devices, such as a monitor, speakers, communications connections, etc., are shown as 416. The output devices 416 communicate with computer architecture 400 through an output interface 418.

Figure 5A:
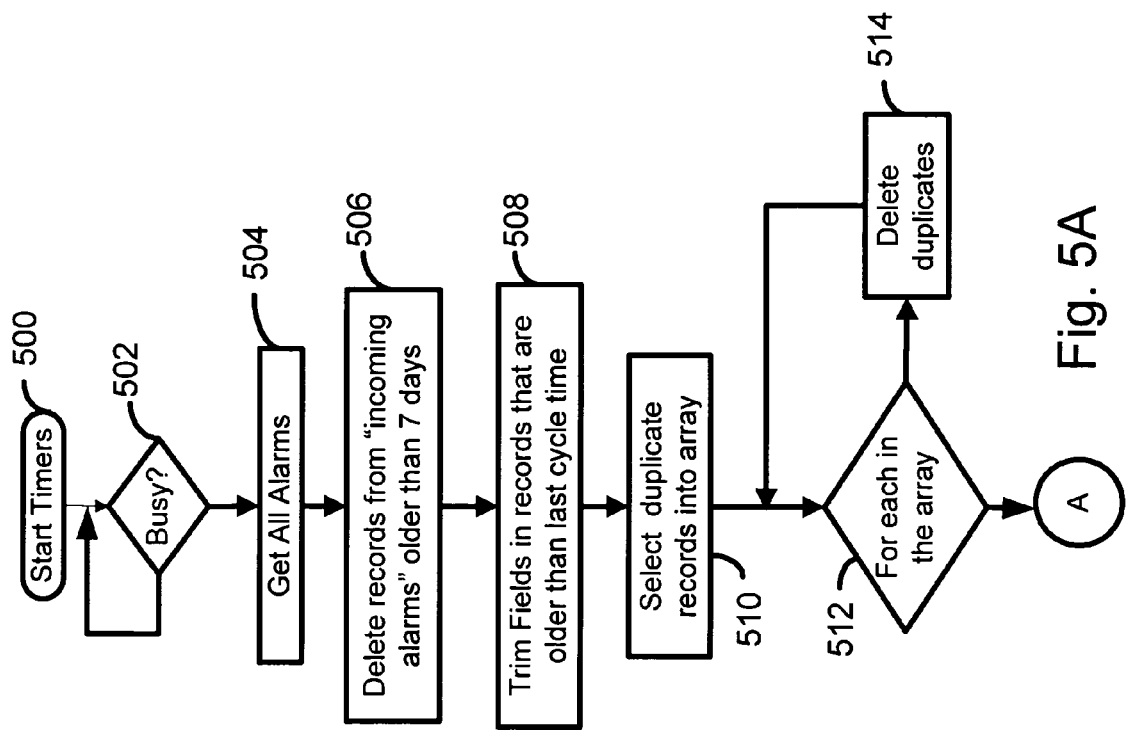
FIGS. 5A, 5B, 5C, and 5D display a flow diagram depicting a method implemented in accordance with the teachings of the present invention.
Figure 5B:
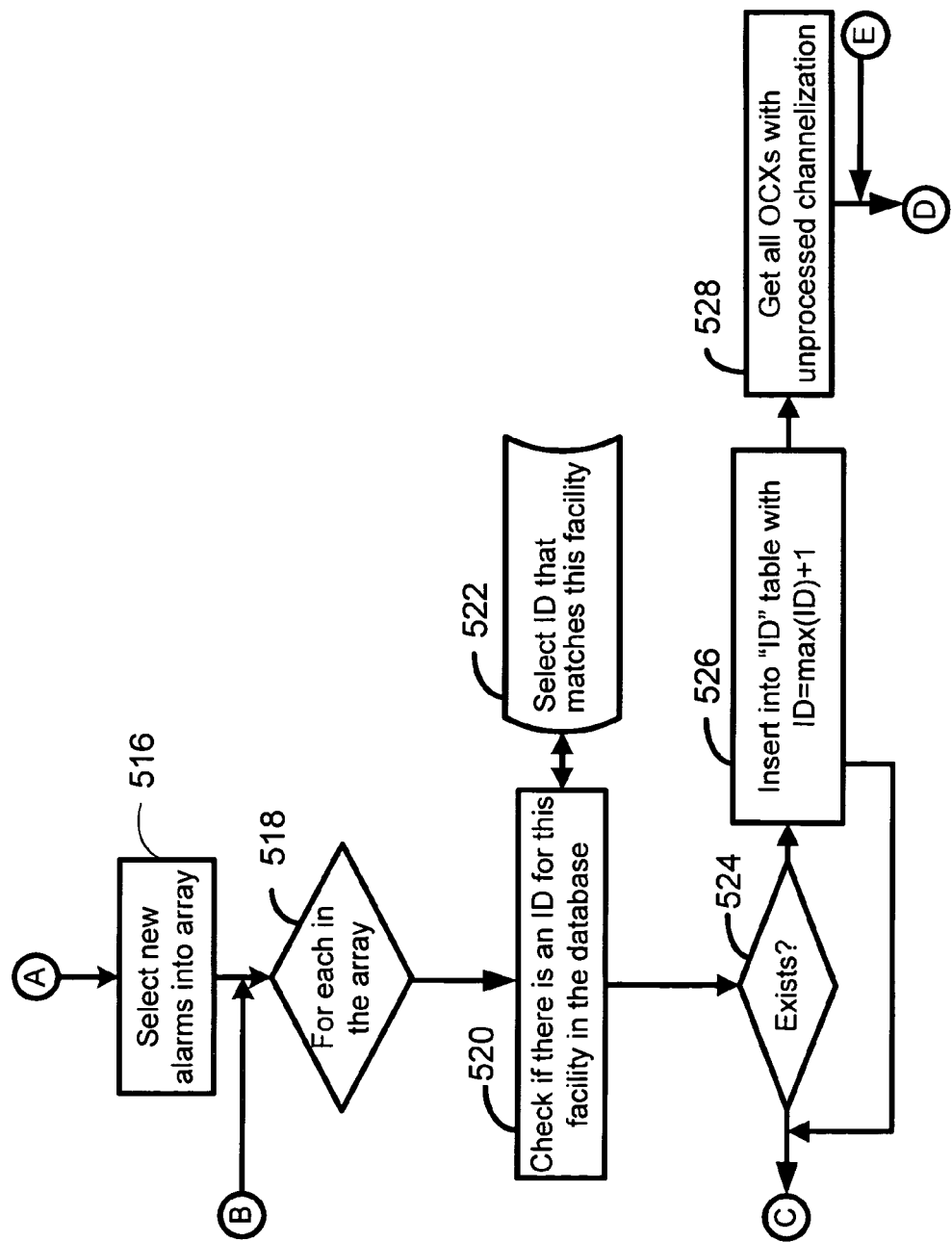
Figure 5C:
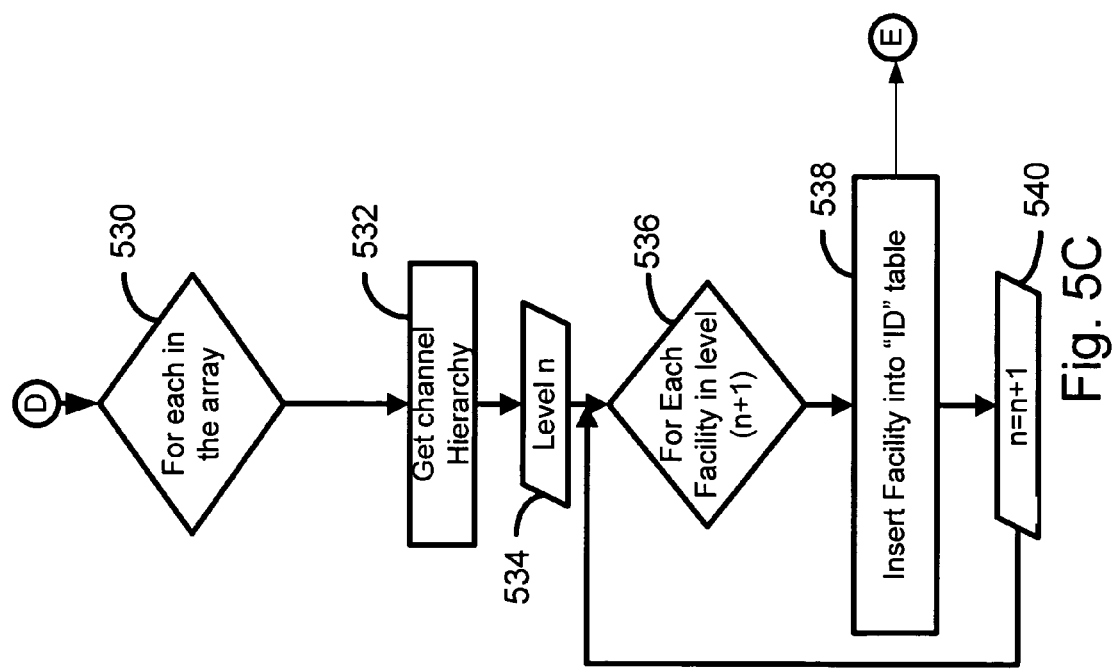
Figure 5D:
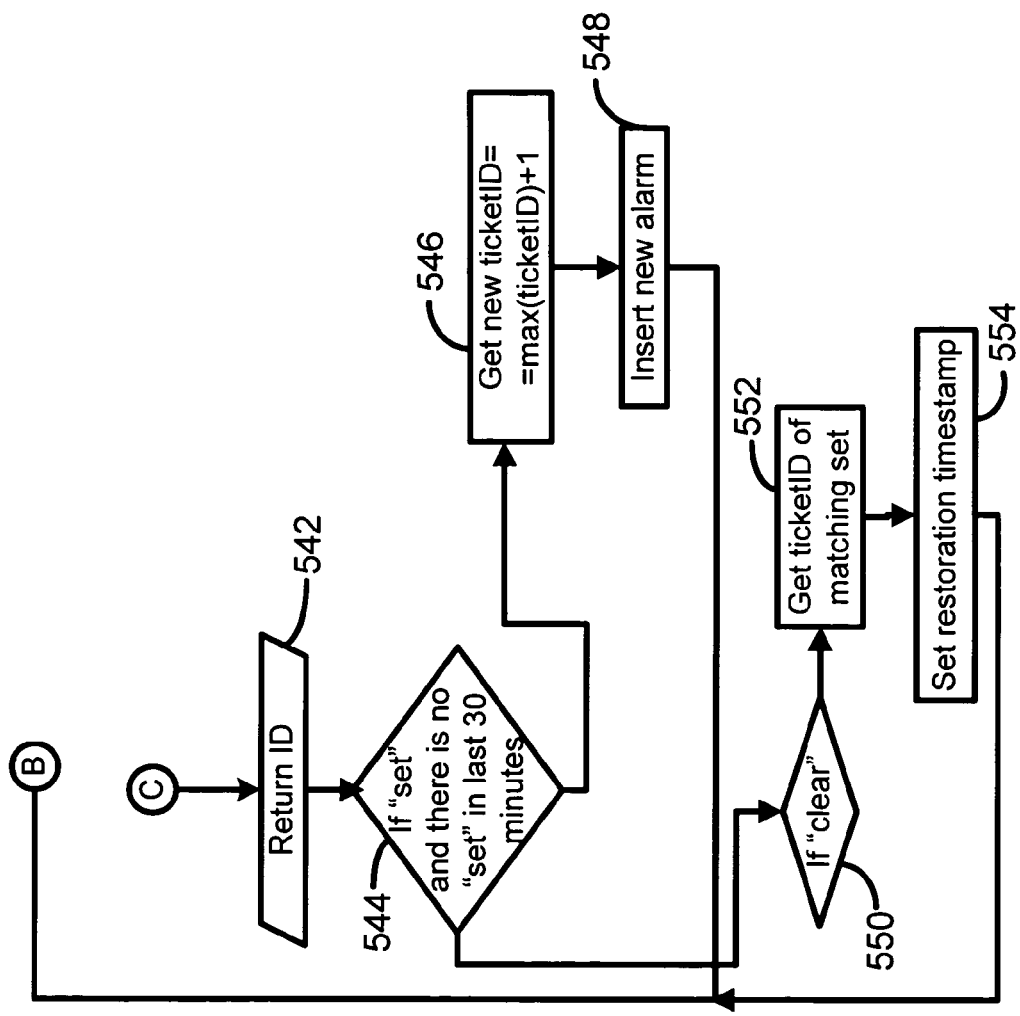

FIGS. 5A, 5B, 5C, and 5D display a flow diagram depicting a method implemented in accordance with the teachings of the present invention. FIG. 5A details a method of removing duplicate alarms. FIG. 5B details a method of inserting new facilities. FIG. 5C details a process for acquiring a channel hierarchy. FIG. 5D details a method of inserting new alarms. In one embodiment, the methods depicted by FIGS. 5A, 5B, 5C, and 5D may be used in combination to determine MOO.

FIG. 5A details a method of removing duplicate alarms. At 500, a timer initiates the polling of a stream of alarms to determine if there are any new alarm starts. At 502, a loop is implemented until all of the alarms have been polled. At 504, all the data between the last poll and the current time is retrieved so that no alarm data is lost. At 506, all of the records older than a certain time periods (i.e., seven days old) are deleted. At 508, the alarm data in the data stream is formatted for placement in a working database since the data is coming from other systems. In one embodiment, the working database is a database used to compile all of the information required in the method of determining the MOO. The data in the data stream includes unique facility identification parameters. In one embodiment, the unique facility identification parameters include a designation or title, a facility type, a first terminating location and a second terminating location. At 510, all duplicate records in the array are selected. At 512, for each item in the array all duplicate are selected. Since some alarms are reported several times, at 514, duplicate records corresponding to these alarms are deleted. This ultimately assures that there is no redundant data in the working database.

FIG. 5B details a method of inserting new facilities. At 516, new alarms are selected for insertion into the array. In other words, alarms from the stream of alarms are selected for insertion into the working database. At 518, for each record in the array, there is a test to determine if the facility inventory is in the database as stated at 520. To check if the facility inventory is in the working database, at 522, an ID is selected that matches the facility. At 524, if the facility inventory does not exist, a new entry is created and inserted into the working database as stated at 526. To accomplish this objective, at step 528, the process receives details on the facility hierarchy (i.e., structure, levels, services, etc.) from other systems.

FIG. 5C details a process for acquiring a channel hierarchy. In FIG. 5C, for each facility in the array (i.e., 530), the facility hierarchy is retrieved from a facility database as stated at 532. In one embodiment of the present invention, the facility database is a knowledge database which may include OC48 information, circuit ID information, which customers are organized on which facility, which services are riding on which facility, such as ATM, IP, frame relay, the full hierarchy of the facility, etc. It should be appreciated that this information is defined for a variety of facilities. The facility hierarchy is acquired for each level or sub-level in a facility hierarchy as stated at 536. At step 538, when the facility is acquired, the facility is inserted into the working database. At 540, the system loops to continue to process each facility.

FIG. 5D details a method of inserting new alarms. At 542, the circuit or facility ID is provided. The method of FIG. 5D uses alarm "set" and alarm "clear". If a facility has an alarm associated with it, the alarm is "set." If an alarm is disassociated with a facility, the alarm is "clear." At 544, if the facility experiences a failure and there has been no alarm "set" for a period of time (i.e., 30 minutes), an alarm is set. The alarm is then processed as stated at 546 and the alarm is inserted into the working database as stated at 548. If the alarm is not set and more than 30 minutes has passed as stated at 544, then the alarm is set to "clear" as stated at 550. An alarm ticket that was previously created during the "set" step is then retrieved as stated at 552. At step 554, the time that the facility has been restored or cleared is designated.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of operating comprising the steps of:
    receiving information identifying a higher-level alarm associated with a SONET facility, wherein the information defines a first time period;
    receiving information identifying a lower-level alarm associated with a SONET facility, wherein the information defines a second time period;
    determining minutes of outage in response to receiving the information identifying the higher-level alarm associated with the SONET facility and the information identifying the lower-level alarm associated with the SONET facility by subtracting the overlap between the first time period and the second time period.

2. A method of determining minutes of outage comprising the steps of:
    acquiring facility hierarchy information, the facility hierarchy information depicting a facility hierarchy, the facility hierarchy including higher levels and lower levels;
    determining outage for each of the levels in the facility hierarchy in response to acquiring the facility hierarchy information; and
    determining minutes of outage in response to determining the outage for each of the levels in the facility hierarchy, including correlating the outage for each of the levels by subtracting overlap between outage of the higher levels and outage of the lower levels.

3. A method of determining minutes of outage as set forth in claim 2, wherein the facility hierarchy information details a SONET facility hierarchy.

4. A method of determining minutes of outage as set forth in claim 2, wherein the higher and lower levels include an OC48 level.

5. A method of determining minutes of outage as set forth in claim 2, wherein the higher and lower levels include an OC1 level.

* * * * *